United States Patent [19]

Perrella

[11] Patent Number: 4,540,144

[45] Date of Patent: Sep. 10, 1985

[54] TELESCOPING FUEL PROBE

[75] Inventor: Andrew P. Perrella, Milford, Conn.

[73] Assignee: United Technologies Corporation, Hartford, Conn.

[21] Appl. No.: 568,459

[22] Filed: Jan. 5, 1984

[51] Int. Cl.³ .............................................. B64D 39/02
[52] U.S. Cl. .................................... 244/135 A; 141/46
[58] Field of Search ....................... 244/135 R, 135 A; 141/46, 114, 266, 284; 222/74, 75; 92/111, 108

[56] References Cited

U.S. PATENT DOCUMENTS

| | | | |
|---|---|---|---|
| 808,941 | 1/1906 | Miller et al. | 141/46 |
| 1,742,166 | 12/1929 | Gartin | 92/111 |
| 2,663,523 | 12/1953 | Leisy | 244/135 A |
| 2,862,448 | 12/1958 | Belding | 92/111 |
| 3,335,642 | 8/1967 | Rosaen | 92/111 |
| 3,476,140 | 11/1969 | Jusyk | 244/135 A |

Primary Examiner—Galen L. Barefoot
Attorney, Agent, or Firm—Gerald E. Linden

[57] ABSTRACT

The telescoping member of an aerial refueling probe is hydraulically actuated for extension/retraction by pressurized fuel. The force for extending the probe is the result of fuel pressure against a check valve in the end of the telescoping member. The force for retraction is the result of fuel pressure in a retraction chamber between the telescoping member and the inner fixed member of the probe wherein the separating force generated therein retracts the telescoping member. A housing is provided to isolate the probe from the environment and to reduce the frictional forces that resist the telescoping motion. A system for locking the telescoping member in its retracted position and in its extended position is also provided. The telescoping member and the housing may be composite graphite/epoxy.

5 Claims, 1 Drawing Figure

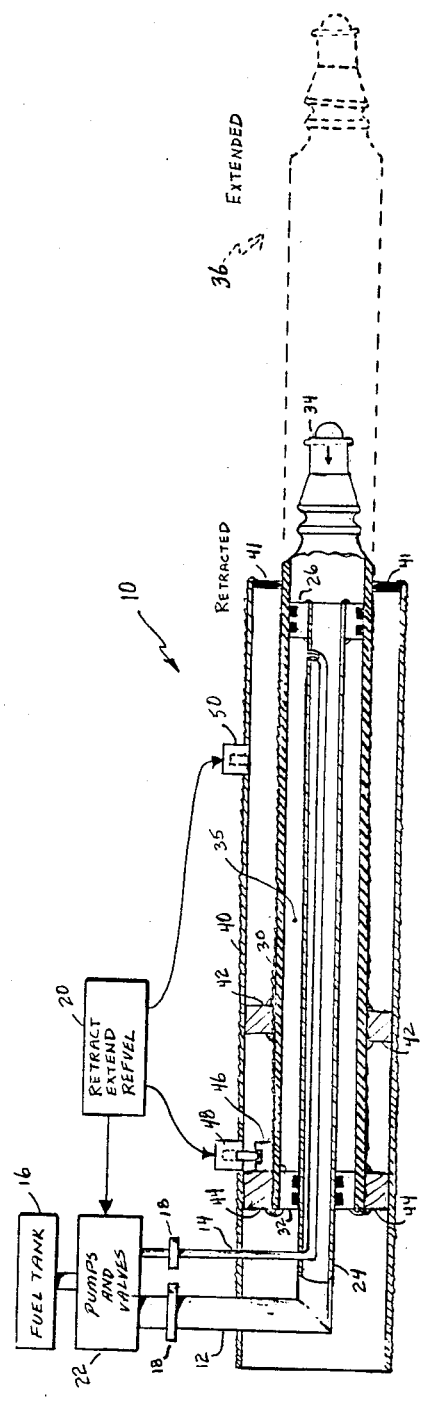

TELESCOPING FUEL PROBE

The Government has rights in this invention pursuant to Contract No. F33657-82-C-0225 awarded by the Department of the Air Force.

DESCRIPTION

1. Technical Field

This invention relates to a telescoping fuel probe for in-flight refueling of a helicopter.

2. Background Art

Historically, telescoping, aerial refueling probes are fabricated of metal, usually aluminum, and are actuated pneumatically using hot engine bleed air. The hot bleed air has been found to dry out the probe's seals and to cause corrosion of the aluminum, thereby creating a stiction problem during extension and retraction.

A typical pneumatically-activated probe of the prior art is found in U.S. Pat. Nos. 3,421,717 (DiPiro, 1969) and 3,432,121 (Delaney, 1969). Therein, an outer tube extends telescopingly over an inner tube and is within a housing. Two chambers are formed between the outer tube and the housing: an extension chamber and a retraction chamber. To extend the probe, the extension chamber is pressurized with engine bleed air and to retract the probe, the retraction chamber is pressurized. The bleed air is sealed in the retraction chamber by a seal which is exposed to the environment.

DISCLOSURE OF THE INVENTION

Therefore, it is an object of this invention to eliminate the use of engine bleed air in a telescoping fuel probe, thereby eliminating the necessity to tap bleed air from the engine, extending seal life, and reducing stiction. Another object of this invention is to eliminate the environmentally-exposed pressurized seal.

According to the invention, the fuel probe has an inner stationary tube and an outer telescoping tube. The inner tube is connected at one end to a main fuel line, and at its other end it has a flange having an outside diameter (o.d.) that is larger than the o.d. of the inner tube. The inside diameter (i.d.) of the outer tube corresponds to the o.d. of the inner tube flange. The outer tube terminates at one end in a flange having an i.d. that is smaller than the i.d. of the outer tube. The i.d. of the outer tube flange corresponds to the o.d. of the inner tube. Therefore, a retraction chamber is defined by the overlapping region between the two tubes and the two flanges. When the retraction chamber is pressurized by fuel, the flanges move apart from one another, or, in other words, the outer tube retracts over the inner tube. The other end of the outer tube terminates in a check valve that permits fuel to enter the outer tube through the check valve, but prohibits fuel from exiting the outer tube. Therefore, when the main fuel line is pressurized, a force is exerted upon the check valve, which causes the extension of the outer tube. Pressurization of the retraction chamber is via a secondary fuel line that is disposed substantially within the inner tube so that the fluid communication between the secondary fuel line and the retraction chamber is through a wall of the inner tube.

According further to the invention, a stationary tubular housing surrounds the probe. Bearings between the housing and the outer tube provide sliding support therebetween. In furtherance of the well-accepted goal of reducing airframe weight, the outer tube and the housing may be filament wound, graphite/epoxy.

The above and other objects, features and advantages of this invention will become apparent in light of the following description and accompanying drawing.

BRIEF DESCRIPTION OF THE DRAWING

The sole figure is a view, partially in cross-section, of the invention

BEST MODE FOR CARRYING OUT THE INVENTION

The sole figure shows a fuel probe 10 connected via a main fuel line 12 and a secondary fuel line 14 to a fuel tank 16. Couplings 18, 18 are interposed in the fuel lines 12 and 14 to facilitate the installation and removal of the fuel probe 10 from a body such as an aircraft. The probe 10 has three modes of operation: RETRACT, EXTEND, and REFUEL, which are selected by a switch 20 that controls pumps and valves 22 to selectively apply fuel under pressure from the fuel tank to fuel lines 12 and 14 in the retract and extend modes and to pump fuel into the fuel tank 16 in the refuel mode.

An inner tube 24, such as an aluminum line, is stationary with respect to a body to which the fuel probe 10 is mounted. The inner tube 24 is connected in fluid communication at one end to the main fuel line 12 and at the other end terminates in a flange 26 that has an outside diameter (o.d.) that is larger than the o.d. of the inner tube 24. An outer tube 30 is movable and has an inside diameter (i.d.) that corresponds to the o.d. of the flange 26. At one end of the outer tube 30 there is a flange 32 that has an i.d. that is smaller than the i.d. of the outer tube 30. The i.d. of the flange 32 corresponds to the o.d. of the inner tube 24. Therefore, the points of sliding contact between the inner tube 24, which is stationary, and the outer tube 30, which is telescoping, are the two flanges 26 and 32 which slide upon the inner surface of the outer tube and the outer surface of the inner tube, respectively. Therefore, those two surfaces must be smooth and of uniform cross-section to permit sliding (telescoping). The outer tube 30 has at its other end a check valve 34, such as a MIL-N-25161C Flexible Tip Nozzle. The check valve 34 permits fuel to flow in the direction indicated by the arrow; in other words, fuel can enter the probe 10 via the check valve 34, but cannot exit therethrough. A retraction chamber 35 is defined and bounded by the overlapping regions of the inner tube 24 and the outer tube 30. In other words, the retraction chamber 35 is the space between the inner tube 24, the outer tube 30, the flange 26 and the flange 32. The retraction chamber 35 is in fluid communication with the secondary fuel line 14, which is shown herein as being disposed substantially within the inner tube 24 so that fluid communication between the secondary fuel line 14 and the retraction chamber 35 is through a wall of the inner tube 24. Seals are provided in the flanges 26 and 32 to prevent fuel from leaking past the flanges.

In the extend mode, fuel is applied under pressure from the fuel tank 16, by the pumps and valves 22, to the main fuel line 12, which fills the inner tube 24. The pressurized fuel in the inner tube 24 exerts a force upon the check valve 34 since it cannot flow therethrough. In response to that force, the outer tube 30 telescopes to the extended position, which is shown in the figure by the broken lines 36.

In the retract mode, fuel is applied under pressure from the fuel tank 16, by the pumps and valves 22, to the secondary fuel line 14, which fills the retraction chamber 35. The pressurized fuel in the retraction chamber 35 exerts a separating force between the flanges 26 and 32. In response to that force, the outer tube 30 telescopes to the retracted position, which is shown in the figure by the solid lines.

In the refuel mode, fuel is applied under pressure to the check valve 34 by a mating nozzle (not shown), whereupon it enters the inner tube 24 and the main fuel line 14 from whence it is pumped by the pumps and valves 22 to the fuel tank. The provision of fuel under pressure during refueling does not apply extending or retracting forces to the probe. The probe 10 may be either extended or retracted during refueling, although for in-flight refueling it is typically extended.

In order to seal the probe 10 against the environment and to provide better sliding support for the telescoping outer tube 30, a housing 40 is provided around the probe 10 so that it substantially envelopes the entire probe 10 in its retracted position. The housing 40 may also be the structural load-member support for the probe 10. A dust seal 41 prevents environmental contaminants from entering the housing 40 by sealing between the housing 40 and the outer tube 30. Both the housing 40 and the outer tube 30 may be manufactured from composite materials, such as filament wound graphite/epoxy. When laying up the composite materials on a mandrel, it is relatively easy to maintain a smooth bore, or i.d. Therefore, guide bearings, such as collars 42 and 44 are provided on the outer tube 30 and have an o.d. that corresponds to the i.d. of the housing 40 and are in sliding contact with the bore of the housing 40. To enhance sliding, a teflon liner may be incorporated in the bore of the housing 40. In practice, the outer tube 30 is of twin wall construction; the outer wall of which is the composite graphite/epoxy, and the inner wall of which is an aluminum fuel line similar to that used for the inner tube 24.

It is desirable to lock the probe 10 in its extended and retracted positions. Therefore, a detent 46 is provided on the outer tube 30. In the retracted position the detent 46 aligns with a locking device, such as a plunger solenoid 48, the plunger of which engages the detent 46 in response to a signal from the switch 20. Similarly, in the extended position, the detent 46 aligns with a plunger solenoid 50. It should be understood that stops (not shown) are required for the extended and retracted positions, which stops may be incorporated in the actuators. The detailed operation of the pumps and valves 22, in conjunction with the actuation of the solenoids 48 and 50, is straightforward so far as this invention is concerned.

The required fuel pressure and delivery rates to effectuate extension and retraction are calculated based on the volumes of the inner tube 24 and the retraction chamber 35 in accordance with performance criteria. Some representative figures are: 4 gpm for extension and 1½ gpm for retraction, with a pressure head of 35 psi; and the probe is capable of operating in the refuel mode at 300 gpm at 50±5 psi, and is compatible with existing aerospace rescue and recovery service tanker aircraft. Lines and components are designed for 60 PSIG operating pressure, 120 PSIG proof pressure, and 180 PSIG ultimate pressure without leaks or permanent damage. In the context of mounting the probe to a helicopter, the primary considerations in determining the mounting location of the probe are blade-flapping clearance and ground clearance during hard-landing conditions, as well as anticipated FLIR and radar installation clearance requirements.

It should be understood that some of the relative dimensions shown in the drawing are exaggerated to show detail.

While the invention has been shown and described with respect to a particular embodiment, it should be understood that various changes may be made thereto without departing from the spirit and scope of the invention.

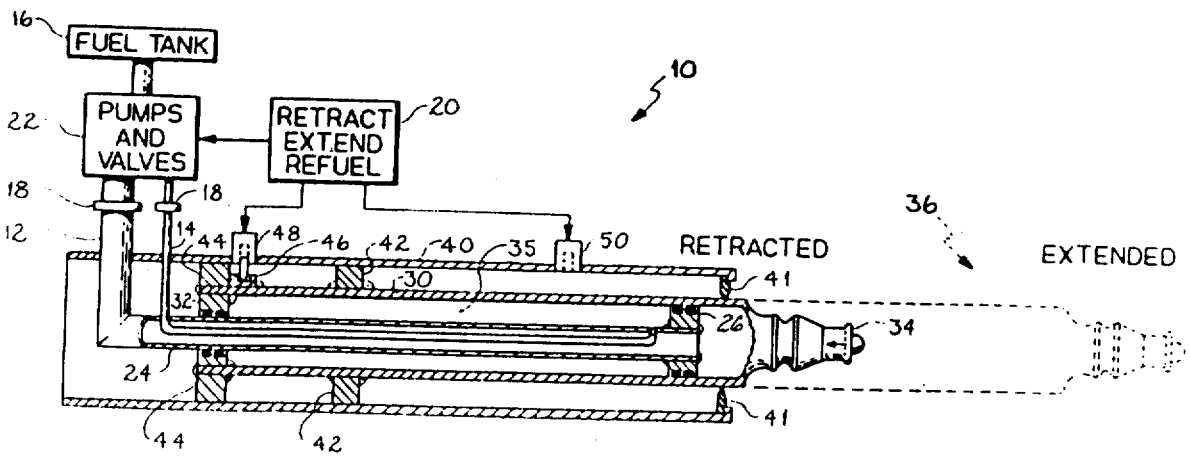

What is claimed is:

1. A telescoping fuel probe comprising;
    a main fuel line for providing fuel to the probe to extend the probe and for receiving fuel from the probe;
    a secondary fuel line for providing fuel to the probe to retract the probe;
    a check valve;
    a stationary inner tube, connected at one end to the main fuel line and terminating at the other end in a first flange having an outside diameter larger than the outside diameter of the inner tube;
    a movable outer tube disposed about the inner tube and having an inside diameter that corresponds to the outside diameter of the first flange, connected at one end to the check valve so that fluid can enter the outer tube through the check valve, but cannot exit the outer tube through the check valve, and terminating at the other end in a second flange that has an inside diameter that is smaller than the inside diameter of the outer tube, wherein the inside diameter of the second flange corresponds to the outside diameter of the inner tube; and
    a retraction chamber defined by the inner tube, the outer tube, the first flange, and the second flange, said retraction chamber in fluid communication with the secondary fuel line.

2. A fuel probe according to claim 1, wherein the secondary fuel line is disposed substantially within the inner tube so that the fluid communication between the secondary fuel line and the retraction chamber is through a wall of the inner tube.

3. A fuel probe according to claim 1, having seals disposed in both the first flange and the second flange.

4. A fuel probe according to claim 1, comprising:
    a tubular housing surrounding the outer tube; and
    bearings for providing sliding support between the outer tube and the housing.

5. A fuel probe according to claim 4, wherein the inner tube and the housing are filament wound graphite/epoxy.

* * * * *

UNITED STATES PATENT AND TRADEMARK OFFICE
CERTIFICATE OF CORRECTION

PATENT NO. : 4,540,144

DATED : September 10, 1985

INVENTOR(S) : Andrew P. Perrella

It is certified that error appears in the above-identified patent and that said Letters Patent is hereby corrected as shown below:

The title page should be deleted to appear as per attached title page.

The sheet of drawing should be deleted to be replaced with per attached sheet of drawing.

Signed and Sealed this

Eighteenth Day of February 1986

[SEAL]

Attest:

Attesting Officer

DONALD J. QUIGG

Commissioner of Patents and Trademarks

United States Patent [19]

Perrella

[11] Patent Number: 4,540,144
[45] Date of Patent: Sep. 10, 1985

[54] TELESCOPING FUEL PROBE

[75] Inventor: Andrew P. Perrella, Milford, Conn.

[73] Assignee: United Technologies Corporation, Hartford, Conn.

[21] Appl. No.: 568,459

[22] Filed: Jan. 5, 1984

[51] Int. Cl.³ .............................. B64D 39/02
[52] U.S. Cl. ........................ 244/135 A; 141/46
[58] Field of Search ............ 244/135 R, 135 A; 141/46, 114, 266, 284; 222/74, 75; 92/111, 108

[56] References Cited

U.S. PATENT DOCUMENTS

| | | | |
|---|---|---|---|
| 808,941 | 1/1906 | Miller et al. | 141/46 |
| 1,742,166 | 12/1929 | Gartin | 92/111 |
| 2,663,523 | 12/1953 | Leisy | 244/135 A |
| 2,862,448 | 12/1958 | Belding | 92/111 |
| 3,335,642 | 8/1967 | Rosaen | 92/111 |
| 3,476,140 | 11/1969 | Jusyk | 244/135 A |

Primary Examiner—Galen L. Barefoot
Attorney, Agent, or Firm—Gerald E. Linden

[57] ABSTRACT

The telescoping member of an aerial refueling probe is hydraulically actuated for extension/retraction by pressurized fuel. The force for extending the probe is the result of fuel pressure against a check valve in the end of the telescoping member. The force for retraction is the result of fuel pressure in a retraction chamber between the telescoping member and the inner fixed member of the probe wherein the separating force generated therein retracts the telescoping member. A housing is provided to isolate the probe from the environment and to reduce the frictional forces that resist the telescoping motion. A system for locking the telescoping member in its retracted position and in its extended position is also provided. The telescoping member and the housing may be composite graphite/epoxy.

5 Claims, 1 Drawing Figure